United States Patent Office

3,822,116
Patented July 2, 1974

3,822,116
REAGENT AND METHOD FOR CALCIUM DETERMINATION
Leo G. Morin, Miami, Fla., assignor to Medico Electronic, Inc., Indianapolis, Ind.
No Drawing. Filed Aug. 30, 1972, Ser. No. 284,884
Int. Cl. G01n 33/16
U.S. Cl. 23—230 B          10 Claims

ABSTRACT OF THE DISCLOSURE

A method and reagent for the determination of calcium in biological fluids by the complex formation with o-cresolphthalein complexon in an alkaline amphiprotic buffer is disclosed.

BACKGROUND OF THE INVENTION

(1) Field of this Invention

This invention relates to a novel colorimetric method for the determination of calcium in biological fluids.

(2) Prior Art

Calcium determinations are of considerable clinical significance, since elevated calcium levels will occur in renal failure, hypertension, carcinoma, and hyperparathyroidism. Further, low calcium levels occur in pancreatitis, hypoparathyroidism, leukemia and pregnancy.

Aside from sophisticated spectrographic and activation analyses, there are two basic approaches to calcium determinations: (1) titration, and (2) colorimetric. Titration methods are time-consuming and have to be performed very precisely; consequently, colorimetric methods are preferred for routine laboratory use. There are numerous colorimetric indicators of calcium, including glyoxal bis (2-hydroxyanil), alizarinsulfonate, eriochrome blue, and o-cresolphthalein complexon. These indicators are not specific for calcium and, under the usual assay conditions, also indicate magnesium. To overcome this difficulty, 8-hydroxyquinoline is usually added to bind interfering magnesium. With the exception of o-cresolphthalein complexon, all prevalent calcium indicators are unsuitable for direct determination of calcium due either to poor solubility, high degree of light or temperature sensitivity, or incompatibility with proteins. For this reason, o-cresolphthalein complexon is the colorimetric indicator of choice in the art. However, all o-cresolphthalein complexon procedures currently in use (e.g., Kessler, G., and Wolfman, M., Clin. Chem. X:686, 1964; Gitelman, H., Anal. Biochem. XVIII:521, 1967) must use 8-hydroxyquinoline to remove interfering magnesium. Unfortunately, 8-hydroxyquinoline is not specific for magnesium, but also removes some calcium. Another problem results from the binding of calcium by proteins. Clinically useful calcium determinations are those for total serum calcium. Current methods require that the serum be acidified first to release protein-bound calcium, then protein must be removed, and this is followed by the addition of an alkalizing agent to form the calcium complex with o-cresolphthalein complexon. It is desirable to have a method and reagent that will measure total serum calcium directly without the need of 8-hydroxyquinoline, deproteinization, nor acidification followed by alkalinization.

BROAD DESCRIPTION OF THIS INVENTION

It is the primary object of this invention to provide a direct colorimetric method for the determination of total serum calcium, and a suitable reagent therefor.

Another object is to provide a method that will not require the use of 8-hydroxyquinoline to remove magnesium interference, and a suitable reagent therefor.

Still another object is to provide a method that will not require acidification to release protein-bound calcium, and a suitable reagent therefor.

Yet another object is to provide a method that will not require deproteinization, and a suitable reagent therefor.

It has been found that in an amphiprotic buffer at an alkaline pH, o-cresolphthalein complexon will form an immediate color complex with both ionized and protein-bound calcium. In addition, it has been found that under these conditions, magnesium produces no interference up to 20 mg. percent, a level considerably higher than would ever be encountered in normal or pathological serum. It is not necessary to include 8-hydroxyquinoline in the reagent of this invention. Acidification of the reagent of this invention is not necessary, nor is deproteinization necessary. It is believed that amphiprotic buffers function by binding calcium and removing it from proteins, making it available to o-cresolphthalein complexon.

The reagent of this invention is comprised of o-cresolphthalein complexon in an aqueous, alkaline, amphiprotic buffer solution. Preferably the reagent of this invention contains water, 0.0005 to 1 gram percent of o-cresolphthalein complexon, and 1 to 40 percent by weight or volume of an amphiprotic buffer. The reagent has a pH of 8 to 13.

This invention is practised by mixing a small sample of biological fluid in a ratio of 1/100 to 1/25 with a reagent comprised of water, 0.0005 to 1 gram percent of o-cresolphthalein complexon and an amphiprotic buffer. The reagent has a pH of 8 to 13. The reagent contains 1 to 40 percent by weight or volume of the amphiprotic compound. The absorbance is read immediately or within an hour between 500 and 620 nm., ideally at 570 nm., and is converted to calcium concentration. There is a linear proportion between absorbances and the calcium concentration.

The reagent and process of this invention can be used, for example, to make calcium determinations to see if elevated calcium levels are present, as such high levels occur in renal failure, hypertension, carcinoma, and hyperparathyroidism, and to see if low calcium levels are present, as such low levels occur in pancreatitis, hypoparathyroidism, leukemia and pregnancy.

The reagent and process of this invention are useful in determining the amount of calcium in all biological fluids.

The biological fluid can be that of man or animal. Examples of biological fluids are serum, plasma, urine and spinal fluid.

DETAILED DESCRIPTION OF THIS INVENTION

Typical amphiprotic buffers are amino acids, e.g., glycine (preferred), alanine, leucine, tyrosine, valine, lysine, phenylalanine, histidine, methionine, threonine, isoleucine, arginine, norvaline, norleucine, ornithine, cysteine, serine, glutamic acid, aspartic acid, homocysteine, cystine, tryptophan and histidine; the peptides, e.g., glycylglycine, glycylserine, leucylglycine, lysyl-glysine, glutamyl-glutamic acid, lysyl-glutamic acid, lysyl-histidine, lysyl-aspartic acid, tyrosyl-aspartic acid, glutamyl-tyrosine, tyrosyl-tyrosine and glycyl-arginine; and certain other organic acids, e.g., 2-aminobenzoic acid, 4-aminobenzoic acid, and 4-aminobutyric acid. Most of the amphiprotic buffers are basic enough to cause a resultant pH in the desired pH range, but a base or acid can be added to achieve the desired pH.

The reagent of this invention can also include any suitable base, such as sodium hydroxide (preferred), potassium hydroxide, lithium hydroxide, ammonium hydroxide, lead hydroxide, zinc hydroxide, barium hydroxide, sodium carbonate, barium carbonate, lithium carbonate, ammonium carbonate, borax, lime, ammonium bicarbonate, magnesia, sodium bicarbonate, ferrous hydroxide, trisodium phosphate, hydrazine, and hydroxylamine. Calcium containing bases should not be used. Suitable acids include sulfuric acid, hydrochloric acid, oxalic acid, fumaric acid, benzoic acid, citric acid, lactic acid, benzoic acid, gallic acid, sulfurous acid, orthophosphoric acid, boric acid and hydrocyanic acid.

Any alkaline pH can be used, but preferably a pH between 8 and 13 is used.

Any suitable colorimeter or spectrophotometer can be used to measure the absorbance. Examples of useful colorimeters are: Coleman, Model 44; Perkin-Elmer, Model 124; the colorimeter disclosed in U.S. Ser. No. 224,457, applicants: Raymond W. Kiess and Peter H. Stewart, filed: Feb. 8, 1972, assignee: Kiess Instruments, Inc., 8768 SW. 131st St., Miami, Fla. 33156; and the direct reading colorimeter disclosed in U.S. Pat. No. 3,561,878, inventor: R. W. Kiess.

The term alkaline buffer, as used herein, normally means that a salt of the base is included. An example of glycine buffer includes glycine and a salt or ester thereof, e.g., sodium glycinate.

The following examples illustrate this invention but they do not limit it.

EXAMPLE 1

The reagent is prepared by dissolving 24 grams of sodium hydroxide and 52.2 grams of glycine in a liter of deionized water; adjustment with sodium hydroxide or glycine is made to bring the pH to 10.3. To this buffer is added 0.34 grams of o-cresolphthalein complexon to yield the complete reagent. To a series of tubes, 2.5 ml. of this reagent is dispensed. A set of standards are prepared and made to contain 1, 5, 10, 15, 20, 25 and 30 mg. percent of a specified level of calcium. To each tube is added 20λ of the standards. An intense purple color develops immediately. The tubes are placed in a colorimeter (Coleman Model 44) and the absorbance is determined at 570 nm. It is found that there is a linear proportion between absorbances and the calcium concentrations.

EXAMPLE 2

The reagent is prepared as in Example 1. A set of standards are prepared as in Example 1, except that they are prepared in serum. The test is conducted as in Example 1. The results are the same as in Example 1.

EXAMPLE 3

The reagent is prepared as in Example 1. A set of sera that has been preassayed by atomic absorption and activation analysis is tested as in Example 1. The results are not significantly different from those obtained by the preassay procedure.

What is claimed is:

1. A reagent for the direct and immediate determination of total serum calcium consisting of o-cresolphthalein complexon in an aqueous alkaline, glycine buffer solution, a base being present if needed.

2. A reagent according to Claim 1 wherein the o-cresolphthalein complexon is present at a level between 0.0005 and 1 gram percent.

3. A reagent according to Claim 2 wherein the reagent has a pH between 8 and 13.

4. A reagent according to Claim 3 wherein the glycine buffer is present at 0.01 to 40 percent by weight or volume.

5. A reagent according to Claim 4 wherein the glycine buffer is present at a level of about 5.2 gram percent.

6. A reagent according to Claim 4 wherein the pH is about 10.3.

7. A reagent according to Claim 4 wherein the o-cresolphthalein complexon is present at a level of about 0.034 gram percent.

8. A reagent according to Claim 4 wherein the glycine is comprised of glycine and a salt or ester of glycine.

9. A reagent according to Claim 8 wherein the salt of glycine is sodium glycinate.

10. A method wherein the absorbance of the mixture of biological fluid and reagent of Claim 1 its colorimetrically determined at a point between 500 and 600 nm.

References Cited

UNITED STATES PATENTS

| | | | |
|---|---|---|---|
| 3,457,045 | 7/1969 | Fraguada et al. | 23—230 B |
| 3,754,865 | 8/1973 | Gindler | 23—230 B |

OTHER REFERENCES

Connerty et al., "Determination of Serum Calcium by Means of Orthocresolphthalein Complexon," Amer. Jour. of Clin. Path., vol. 45, No. 3, pp. 290–296, March 1966.

RONALD E. SERWIN, Primary Examiner

U.S. Cl. X.R.

252—408